Nov. 21, 1939.  H. J. KUHLMAN  2,180,594
CORN HARVESTER
Filed Dec. 10, 1936  3 Sheets-Sheet 1
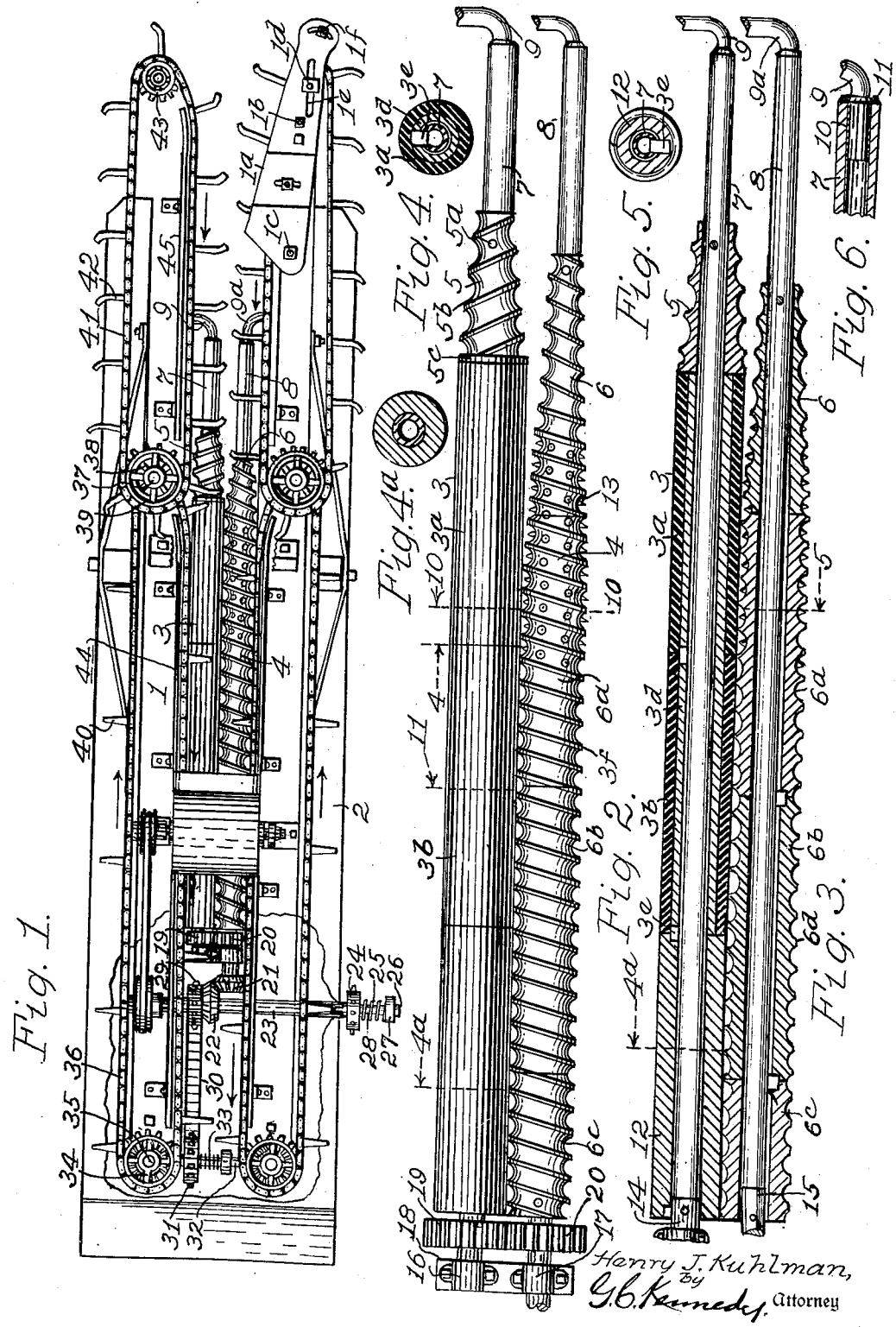
Henry J. Kuhlman,
by G. C. Kennedy, Attorney Nov. 21, 1939.   H. J. KUHLMAN   2,180,594
CORN HARVESTER
Filed Dec. 10, 1936   3 Sheets-Sheet 2
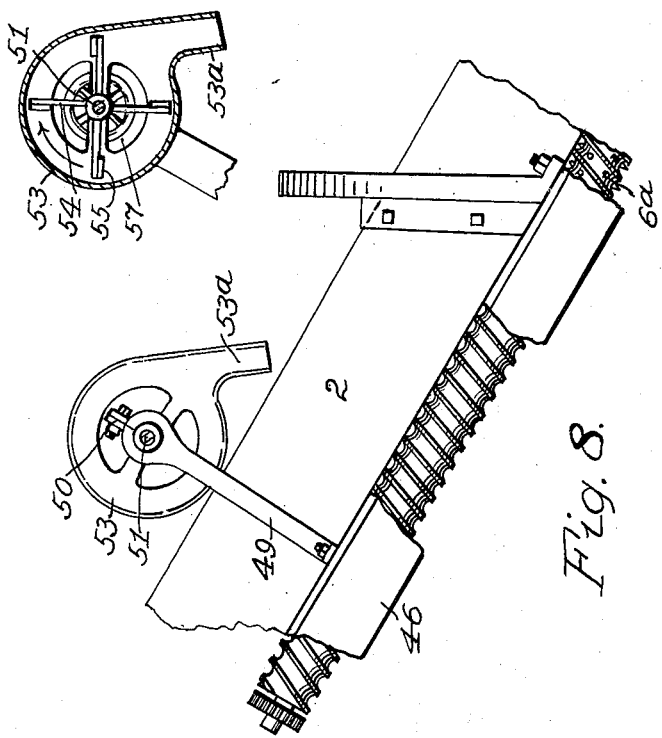
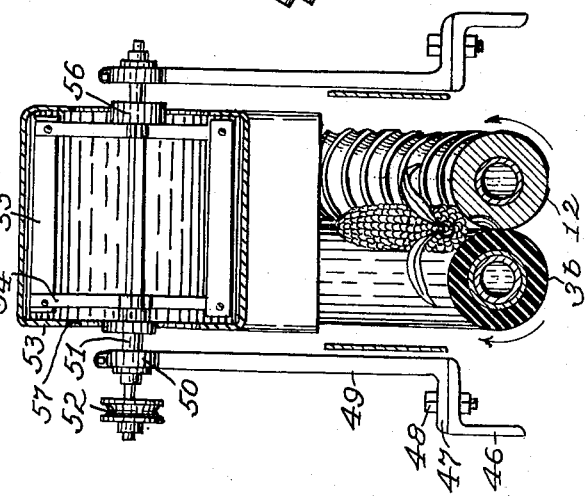
Inventor
Henry J. Kuhlman,
By G. C. Kennedy.
Attorney Nov. 21, 1939.       H. J. KUHLMAN       2,180,594
                     CORN HARVESTER
         Filed Dec. 10, 1936        3 Sheets-Sheet 3
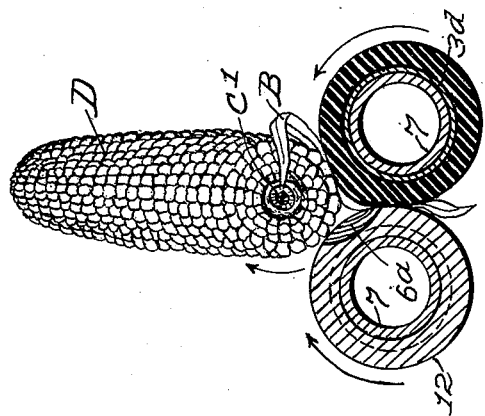
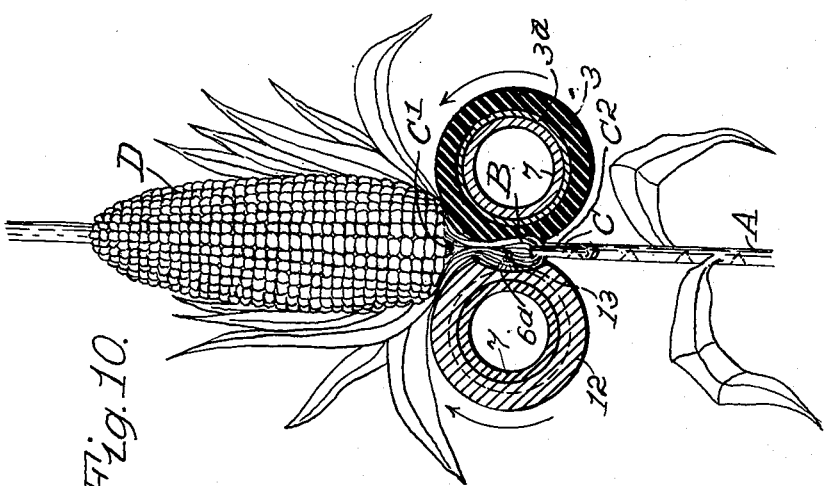
Inventor
Henry J. Kuhlman,
By G. C. Kennedy.
Attorney Patented Nov. 21, 1939

2,180,594

UNITED STATES PATENT OFFICE 2,180,594

CORN HARVESTER

Henry J. Kuhlman, Waterloo, Iowa, assignor to Kuhlman Manufacturing Company, Waterloo, Iowa, a corporation of Iowa Application December 10, 1936, Serial No. 115,112

5 Claims. (Cl. 130—5)

My invention relates to improvements in corn harvesters, and an object of my improvements is to supply improved rolls therefor, particularly a single pair of rolls which, with cooperating appliances, are adapted solely to successfully gather, break ears of corn from their husks, and clean them from adhering remnants if any, before delivering the husked ears from the harvester.

Another object of my improvements is to shape one of the said cooperating pair of rolls with a spiral channel therealong and with detents or other engaging means at a certain portion of its length adapted to frictionally engage or partially enter corn stalks being operated upon to exert downward strain or hold a stalk between this roll and the cooperating other roll while the two rolls in their forwadly inclined positions and in a forward progress are also exerting an upward pressure upon the basal part of the husk of an ear upon the stalk to thereby break the stem of the ear within the husks and simultaneously push the cleaned ear from the husks as the ear is so liberated therefrom, and whereby following propelling devices of the machine may direct the ear rearwardly into and along the upper trough of the rolls to a place of delivery from the machine.

Another object of my improvements is to construct said other roll with either an entire or a partial elastic cover therealong and secured thereto, to wholly or in segmental parts cooperate with the spirally channeled roll in the grasping yieldingly the ear being operated upon by both rolls, so as to perfect the above actions as above stated.

Another object of my improvements is to supply for use in some cases, a terminal bared metal rear portion of the last mentioned roll for use in special cases upon ears which have relatively loose kernels, in order to prevent shelling of some of the kernels during the above series of operations upon an ear.

Another object of my improvements is to provide the second mentioned roll with segments of an elastic cover upon a segmental roll structure, for easy connections or substitutions of the segments of the covered roll.

Another object of my improvements is to shape the forward terminations of both rolls with offset reversely spiraled forward conical portions having forward cylindrical parallel portions, for the reception therebetween during the advance of the machine of the stalks of a hill while alining the stalks seriatim for separated successive entrance within the spiral opposite channels of the rolls.

Another object of my improvements is to provide an improved pair of cores for the rolls removably secured thereon respectively, and with end supports for the cores permitting the rotations of the cored rolls thereon, in corrected alinement and appositions to each other as found suitable and necessary.

Another object of my improvements is to shape the spiral channels upon the first mentioned roll to cooperate with the spiral channel or channels upon the second roll, to cause the coacting rolls to receive the alined stalks to successively loosely receive the stalks therebetween, then to flatly compress them and then deliver them to those engaging means upon the first roll which seize and hold erect and with a downward strain upon the stalk being there treated while the cleaned ear is broken from the stem of the ear within the husks before delivery of the cleaned ear to the rearmost parts of the rolls for delivery.

Another object of my improvements is to combine with the rolls a suitable blower adapted to remove detached husk fragments, dirt or other foreign bodies such as seeds, burrs and the like from the rolls while in operation.

The above and other improvements to the corn harvester are illustrated and described hereinafter in the specification and the claims, and as shown in the accompanying drawings.

It is to be understood that various minor changes may be effected in any of the above improvements, without thereby changing or obviating the protection of these inventions.

This invention pertains to the corn harvester shown in my pending application for patent, Serial Number 98,305, filed August 28, 1936.

In the said drawings, Fig. 1 is a top plan of the said pair of coacting rolls, with associated driving and cooperative mechanisms, other parts of the machine being removed, and with certain parts broken away. Fig. 2 is an enlarged top plan of the said pair of rolls. Fig. 3 is a horizontal longitudinal section of the rolls as shown in said Fig. 2. Fig. 4 is a cross section of the elastically covered roll of said rolls on the broken line 4 of Fig. 2. Fig. 4a is a cross section of the metal surfaced rear part of the last mentioned roll, taken on the broken line 4a of Fig. 2. Fig. 5 is a cross section of the second or spiral channeled roll taken on the broken line 5 of Fig. 3. Fig. 6 is a longitudinal horizontal section of the forward cylindrical terminal of the elastically covered roll, showing it fragmentally, and as supported rotatably upon a bearing bracket, and somewhat magnified. Fig. 7 is an end elevation of a blower adapted to be removably mounted upon the machine bed above the pair of rolls to act thereon. Fig. 8 is a fragmental side elevation of said machine bed and the spirally channeled roll, with the blower mounted on the bed or frame of the machine and positioned for cleaning the rear portions of the rolls. Fig. 9 is a medial longitudinal vertical section of said blower. Figs. 10 and 11 are roll sections showing their operations upon an ear of corn.

My improved corn harvester may be mounted on traveling wheels, such as those of a frame 1 and 2 supported on an axle of a tractor alongside the latter on one side, but more usually a pair of these harvesters are supported at opposite sides of the tractor.

As usual, also, the frame 1 and 2 is supported tiltably by proper means on and near the tractor frame, spaced evenly therefrom, and the frame is inclined forwardly downwardly.

The bed-plate 1 has the angularly outwardly inclined side plates 2, and the medial part of the plate 1 is removed a distance behind its forward end. The rear end part of the plate is inclined downwardly angularly thereacross as a slide portion to deliver cleaned husked corn ears to an endless carrier not shown.

The numerals 3 and 4 denote a coacting reversibly rotatable pair of rolls positioned, as disclosed in Fig. 8, a little below the medial gap in the bed-plate 1, and about midway of its ends longitudinally. Both of the rolls are mounted on like tubular shafts 7 and 8, and both rolls are preferably but not necessarily segmental, although herein the segmental type is shown for reasons to be given. As shown in the Fig. 3, the segments of both rolls are removably secured upon the shafts 7 and 8 respectively by flat lugs 3e projecting outwardly into key ways in the rolls, so that the segments may be mounted or removed slidably and in alinement as shown. Referring to Fig. 6 also, the forward ends of both rolls have brass bushings 10 therein, seating the rolls to rotate thereon, as these bushings are receptive of the spindles of outwardly horizontally curved bracket arms 9 having thereon annular parts 11 as stops for the abutting ends of the shafts and bushings. The arms 9 are adjustably fixed by means not shown to the abutting parts of the bed-plate 1. Shaft parts 14 and 15 are secured removably on and in alinement with the rear end parts of the shafts 7 and 8, and carry the meshed gears 19 and 20 respectively. Bearings 16 and 17 mounted on the plate 1 carry the end parts of the shaft parts 14 and 15, the part 14 terminating in the bearing 16, the part 15 traversing the bearing 17 and terminally carrying a miter-gear 21 meshed with a miter-gear 22 fixed on a cross-shaft 23. On the shaft 23 is mounted a sprocket-wheel 29 carrying one loop of a chain 30 whose rear looped end is carried on a sprocket-wheel 31 on a shaft 32. A coiled spring 33 on the shaft 32 bears on an annulus on the latter and on the hub of the sprocket-wheel 31. On the ends of the latter are miter-gears not shown which are meshed respectively with other miter-gears below the plate 1 on upwardly directed shafts 35 on which are secured the horizontally disposed sprocket-wheels 34 carrying the rear parts of the chains 36, the last-mentioned sprocket-wheels and chains being above the bed-plate 1, which is broken away to disclose the described mechanism beneath the plate. The shaft 23 at one end has a clutch connection to a sprocket-wheel and shaft part at 24 and 25 stressed by a spring 25 bearing on an annulus 27 on the shaft part 26. The wheel 24 is driven by a chain not shown connected to the tractor mechanism alongside.

The mechanism above described for rotating the rolls 3 and 4 is not herein specifically claimed, for other suitable means may be used therefor, as desired. Other devices and mechanisms have been omitted, such as connections to a propelling tractor, or prows or fenders usually employed, although in Fig. 1 a supporting casting 1a for the usual fender is shown as mounted removably upon the forward extension of the bed-plate on a pivot bolt 1b and adjustably rockable thereon, other bolts such as shown at 1c and 1d being used therefor, a forward arcuate slot and bolt connection at 1f being used, with a bolt 1d in a slot 1e for longitudinal adjustments of the casting.

The numeral 37 denotes a pair of shafts, which, as also the rear pair of shafts 35, are perpendicular to the inclined bed-plate and its side parts, and fixed on the shafts 37 at their tops are the like sprocket-wheels 39. On the shafts 37 below the said sprocket-wheels 39 are fixed smaller sprocket-wheels 38. Like sprocket-chains 36 connect the pairs of sprocket-wheels 34 and 38 at each side, and tensioning bars 44 are fixed on the bed-plate 1 within said sprocket-chains along their inner reaches to tension them in retaining them in engagement with said sprocket-wheels.

Small sprocket-wheels 43 are mounted rotatably on shafts at the forward ends of the bed-plate extensions, and sprocket-chains 41 connect the sprocket-wheels 43 and 39 above the level of the rear pair of chains 36, and the chains 41 and 36 have respectively at intervals along their outer sides the rigid fingers 42 and 40, the former having curvate outer ends while the latter fingers are straight. A similar tensioning bar 45 is mounted within each forward chain 41 alongside its inner reach.

Referring to Figs. 4 to 6 inclusive, depicting the coacting oppositely rotatable rolls 3 and 4, the roll 3 is preferably constructed with end-engaged segments as follows. The forward segment 5 is conical and secured upon the hollow shaft 7 by a pin 5a. The segment terminates rearwardly in an annular portion 5c, and is shaped with spiral channels, triplicate, for a purpose to be described, between the raised edges at 5b.

Abutting the rear end of the coned segment 5 is a cylindrical segment 3 of metal having a rubber cover 3a secured thereon. The annulus 5c is flush with and abutting the forward end of this cover 3a to protect the cover end part from rapid abrasion. To the rear of the segment 3 is an abutting like segment 3b with a like rubber cover. To the rear of the segment 3b is a like rubber covered segment, and each of these segments is fixed on a tubular body 3d (see Fig. 4), by means of flat lugs 3e secured to the inner shaft 7 and entering an end recess in each segment, slidably and lockably, to permit the roll segments to be removed from the bearing shaft 7 when desired to replace a segment or segments when its cover is to be replaced or mended in case of wear. As shown in Fig. 3, the rearmost roll segment of each roll is locked releasably by lugs or pins to stub-shafts 14 and 15 respectively of the mated gears 19 and 20.

For a purpose to be hereinafter described, one or more of these rubber covered roll segments of the roll 3 may be of bare metal, instead, as indicated in Fig. 4a and at 12 in Fig. 3.

The other roll 4 is also segmental, and shown in cross section in Fig. 5. This roll has a longer coned segment 6, set farther back than the shorter coned segment 5, but likewise having three spiral channels therealong, the rearmost parts being at a greater angle to the axis of the roll than the forward parts, for a purpose to be described. The all metal segments 6a, 6b and 6c to the rear of said coned segment 6 have spiral channels continuous with those on the segment 6 and set at the same angle as the rearmost parts of the channels on the latter. The channels on the forward part of the segment 6 are wider and shallower than those on the rear part, while the channels on the other segments to the rear are shallower. These metal segments are removably secured slidably on the hollow shaft 8 by means of lugs entering sockets in abutted ends of the segments.

In Fig. 4a is shown a cross section of the roll section 12 of metal, on the roll 4, but, as above stated, the rear or more segments of the roll 3 may be used without a covering of rubber or other elastic substance such as 3a.

In Figs. 7 to 9 inclusive, a rotary blower is shown mounted removably on the frame bars 46 above the bed-plate 1 on standards 49 bolted at 48 to the feet 47 and the bars 46. The casing 53 of the blower can be tilted vertically and held in an adjusted position with bolted furcations 50 about a bearing sleeve traversed by the fan-shaft 51, to direct its spout 53a toward a desired part of the pair of rolls 3 and 4, as shown in their inclined positions in Fig. 7 to the rear. On the shaft 51 within the drum or casing 53 is mounted a plurality of transverse bar vanes 55, on radial arms 54, and the casing has bearing seats 56 for the shaft. The end heads of the casing 53 have air inlets 57 as usual. On the extended part of one shaft end is fixed a grooved pulley 52, connected by a belt to a larger pulley on the drive-shaft 23, driven by the motor of the tractor, or otherwise, as shown in Fig. 1.

*Operation*

When the harvester of Fig. 1 is propelled forwardly at a previously determined rate of speed, the rolls 3 and 4 are oppositely rotated at the same rate of speed, due to the adjustment of the driving elements therefor as determined. The spiral channels on the rolls being in triplicate on each, when the opposite forward ends of the channels on the rolls and their interspace as shown in Figs. 2 and 3 are in coaction and passing loosely about a corn stalk in a row of hills alined ahead, the interspaced ends of the conical heads 5 and 6 do not engage or clasp the stalk, but, as the machine progresses forwardly they guide the stalk by retaining it in an erect position and keep it loose until the heads 5 and 6 traverse the contained stalk to a point where the widening of the diameters of the heads narrow their interspace to clasp the stalk. The coned heads 5 and 6 are spaced rearwardly from the forward ends of the shafts 7 and 8, the heads being offset as shown. The shafts are parallel, hence as the machine advances, pass about all the stalks in a hill aided by the fingers 42 on the inner reaches of the pair of forward chains 41 which tend to aline the stalks to pass in succession between the shaft ends 7 and 8 in spaced alinement. As there are three channels on each roll, one rotation of each roll causes a channel containing a stalk free or engaged between it and the other roll to traverse the stalk in moving ahead the space across three channels longitudinally of the rolls, and hence the speed of rotations of the rolls may be ascertained and regulated relatively to the average speed of movement of the harvester ahead. It will be seen, that as the channels on the conic head of the roll 8 are gradually changed to increase their angularity relative to its axis, the stalk is gradually clutched and laterally compressed when it is clasped as above described, so that such rolls as these may be regulated to suit the circumstances attending the gathering, breaking of the stem of each ear within the enveloping husks, and delivering the cleaned and husked ear to a place of deposit. The spiral channels of the roll 4 extend completely to the end of the roll, and beyond the conic segment 6 the spirals are of the same angularity relative to the axis of the roll. The depth of the channels in the roll are shallow in front and then deepened at or adjacent to the annulus 5c of the roll head 5, and thence rearwardly are shallowed to the rear end of the roll 4. As shown in Fig. 2, the rear portion of the conic head 6 also the forward portion of the next segment 6a have small conic projections 13 alined therealong medially at a short distance apart. When the stalk is grasped by the walls of the opposite channels 5 and 6 at and near the annulus 5c, it is compressed laterally somewhat, so that when the advancing rolls pass about the stalk to the region where the projections 13 are located, these projections, as the rolls turn about, enter the stalk at one side, the spacing of the projections being such that as one projection or conic point is about to emerge from the stalk, the next succeeding point is penetrating the stalk, so that a downward tension is created upon the stalk as the rolls, being forwardly downwardly inclined, climb up the stalk until they arrive at and ride over the stem of an ear thereabove. Referring to Figs. 10 and 11, which represent respectively the consequent breaking of the stem C at C1 within the husks B at the base of the ear D, by the opposite tensions on the stalk due to the downward pull of the projections 13 on the stalk and to the upward pressure exerted by the upward movement of the rolls against the butt of the ear, it will be seen that this process is shown in Fig. 10 at a time when the rolls have engaged the husks B at their bases below the incased ear D, and the time when this upward pressure breaks the stem C within the husks, whereby the released ear is caused to ride up with and upon the rolls as the husks are simultaneously drawn down below the rolls by the action of said projections, and the ear D, as shown in Fig. 11, drops lengthwise into the channel or hollow between the tops of the rolls, where the rearwardly moving fingers 40 on the pair of rear chains 36 propel the cleaned ear therealong until it is delivered over the inclined rear part of the bed-plate to an endless carrier, or other place of deposit.

In the event that a remnant of the husks still adheres to the butt of the cob at its base, as the ear is advanced along the rolls rearwardly as propelled therealong, in Fig. 11 as well as Fig. 10 there is shown in each the elastic cover 3a in rotating inwardly is deformed to engage the ear D, and as the opposite roll is all metal with a lighter grip on the ear, the ear will be rotated in moving along the rolls in a direction indicated by the arrow, which will bring the adherent husk fragments between the rolls, to be there removed between them downwardly. This rotation of the ear also in cases where soil adheres thereto will remove the soil. It is during these operations upon the ear while being broken away from its stem C within the husks, as well as during the further progress of the ear up the rolls, that the above means clean the ear completely, aided by the draft upon it and the rolls from the spout 53a of the blower 53 thereabove. This latter feature is displayed in Fig. 7, where the otherwise stripped ear is positioned where the rotary roll 3b is rotating the ear to bring two adherent husks between the rolls in succession. In Fig. 10, the projecting cones on the roll are shown in dotted lines at C2, and the indentations made thereby in the stalk A appear below the rolls. The ear D is broken from the stem within the husks immediately below the butt of the ear at the least thickness of the stem, as shown.

Referring to said Figs. 2 to 5 inclusive, Fig. 3 shows the roll 3 equipped with a rear segment 12 or iron or other suitable metal, having a bare surface without an elastic cover thereon, and this type of segment is indicated for use in the treatment of hybrid corn or in any case where the kernels may have become loose by reason of exposure to the weather during the winter or for other reasons, and to prevent, in this case, the shelling of some of the kernels in the processes above described. The all metal segment may be at the rear, or otherwise placed on the roll 3 as desired, for the particular case, by original use or by substitution for an elastically covered roll, and without departing from the invention. The user may carry both types, the bare or covered spares, for use as above. The grip of the deformable rubber cover segments upon an ear is considerable and more than that of the roll 4, which is all metal. Thus any variety of corn may be operated upon to successfully in succession, gather the stalks in an alinement, break the ear from the stem of the stalk entirely within the husks, strip the husks downwardly from the rolls while psuhing the broken away ear at the butt from the husks in cleaning the ear, as well as cleaning away any remnants adherent to the ear or other adherent matter thereon, and also separating any burrs which may accompany the ear in its progress, as often occurs.

I claim:

1. A snap roller for corn harvesters comprising a body grooved spirally throughout the major portion of its length, the forward part of the grooved portion being of less diameter than the rearward part of said grooved portion and being generally tapered from the smaller forward end to its junction with said rear portion, the pitch of the grooves on the forward part being greater than the pitch of the grooves on the rearward part, the pitch of the grooves on the rearward part being uniform throughout and the grooves gradually decreasing in depth from the forward end of the rearward part to the rear end thereof.

2. A snap roller for corn harvesters comprising a body grooved spirally throughout the major portion of its length, the forward part of the grooved portion being of less diameter than the rearward part of said grooved portion and being generally tapered from the smaller forward end to its junction with said rear portion, the pitch of the grooves on the forward part being greater than the pitch of the grooves on the rearward part, the pitch of the grooves on the rearward part being uniform throughout and the grooves gradually decreasing in depth from the forward end of the rearward part to the rear end thereof, and studs extending radially from the bottom of the grooves from the rear end of the forward part of the body rearwardly to a point spaced forwardly from the rear end of the rear part of the body, the grooves of the remaining portion of the rear part of the body being smooth throughout.

3. In a corn harvester, a pair of coacting oppositely rotatable gathering, snapping and husking rolls, both of metal, one roll having a forwardly diminished head with a spiral thread therealong, said roll having to the rear of said head a cover of rubber secured thereon, the second roll having a forwardly diminished head with the head and body of the roll continuously threaded therealong, the forward part of the head being threaded with a like pitch to that of the oppositely directed thread of the first roll, the second roll having its thread gradually varied in pitch from about the forward end of the cover of the first roll and for a limited distance alongside said rubber cover, said variation in pitch narrowing the width and lessening of the depth of the trough of the thread along said distance, the thread thence extending rearwardly along the second roll at the same pitch as the head thereof, and whereby alined stalks are traversed by and between the rolls and gradually compressed between them while grasped with a yielding palmar action by the rubber cover of the first roll, and whereby such action of the rolls upon the butt of the husks of an ear causes rupture of the stem of the ear within the husks, then withdrawal of the husks downwardly between the rolls while remaining on the stalks and clearing the ear from the husks.

4. In a corn harvester, a pair of coacting oppositely rotatable gathering, snapping and husking rolls, including in combination stub-shafts fixedly mounted in advance of the rolls, tubular metal shafts having their forward ends rotatably mounted in said stub-shafts, stub-shafts mounted at the rear of the rolls and fixed to the tubular shafts, coengaged gears mounted on the rear stub-shafts, alined end-contacting tubular roll sections releasably keyed to the tubular shafts, the forward section of one roll being conical and having a spiral thread therealong, certain sections to the rear of the conical head being provided with rubber covers fixed therealong, the other roll including a conical head, tubular metal sections end-connected to each other including the said conical head by keys separably, said other roll with its head and other sections releasably keyed together, said head and body the said roll having a thread along its head and body with the part of the head opposite the rubber cover of the first roll changing varyingly in pitch rearwardly opposite the first rubber covered section of the first roll and thence rearwardly returned to its initial pitch, the varied pitch narrowing the width and lessening the depth of the trough of the thread, whereby the coacting rolls successively receive and compress alined stalks of corn between them to engage ears ranged therealong, to cause the rubber covering of the first roll section to yield with a palmar action in such compression to squeeze the husks at the butt of an ear to break the stem of the ear within the husks while progressively withdrawing the husks beneath the rolls, and expelling the husked ear upon the rolls for delivery therefrom.

5. A snap roller for corn harvesters comprising a body grooved spirally throughout the major portion of its length, the forward part of the grooved portion being of less diameter than the rearward part of said grooved portion and being generally tapered from the smaller forward end to its junction with said rear portion, the pitch of the grooves on the forward part being greater than the pitch of the grooves on the rearward part, the pitch of the grooves on the rearward part being uniform throughout and the grooves gradually decreasing in depth from the forward end of the rearward part to the rear end thereof; in combination with a co-acting snap roller comprising a forward spirally grooved portion, a central cylindrical rubber covered portion and a rear cylindrical and smooth portion free of covering and of the same diameter as the rubber covered portion.

HENRY J. KUHLMAN.